Patented Nov. 15, 1949

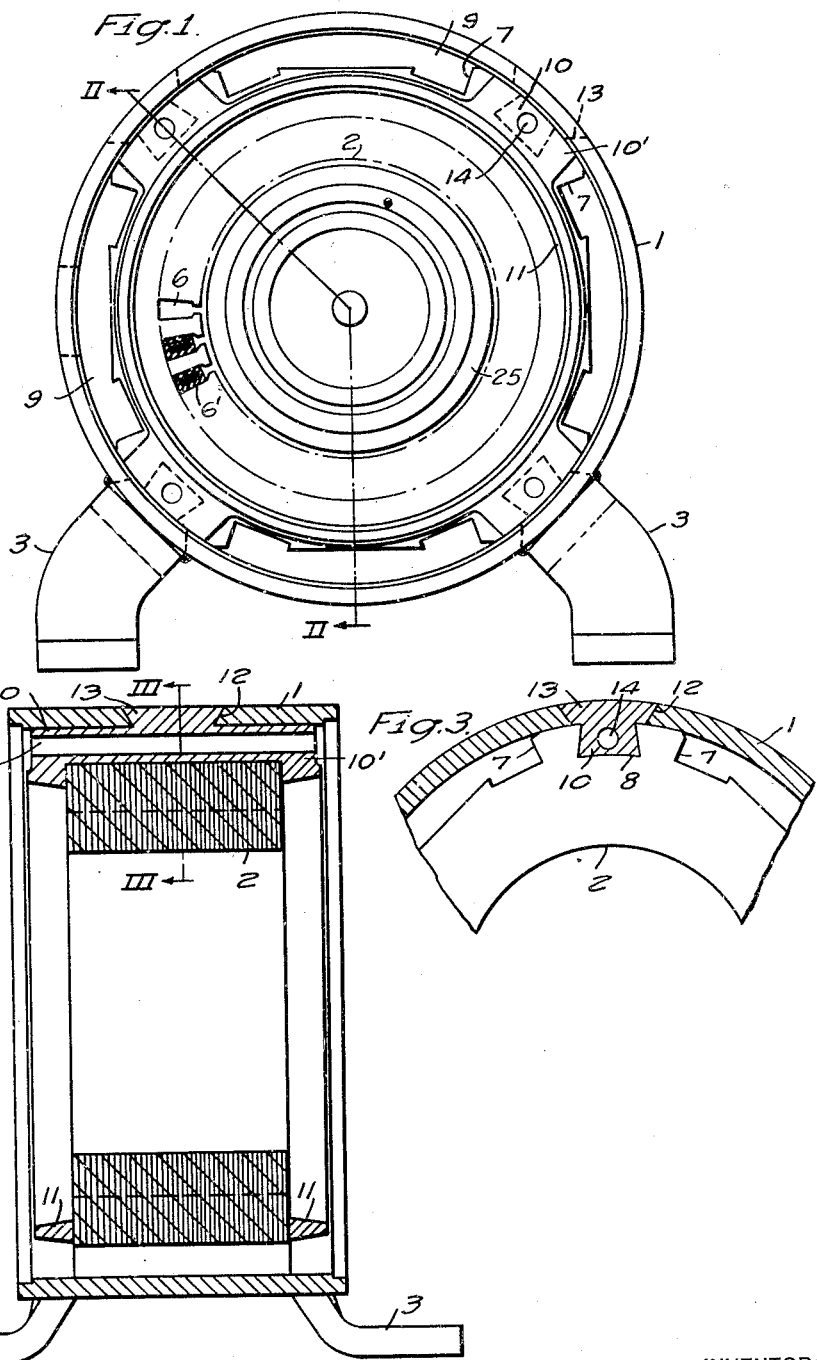

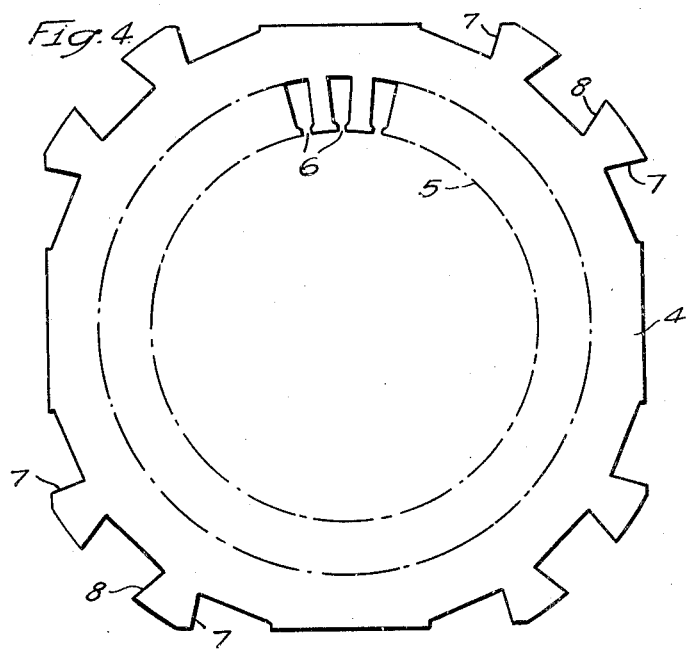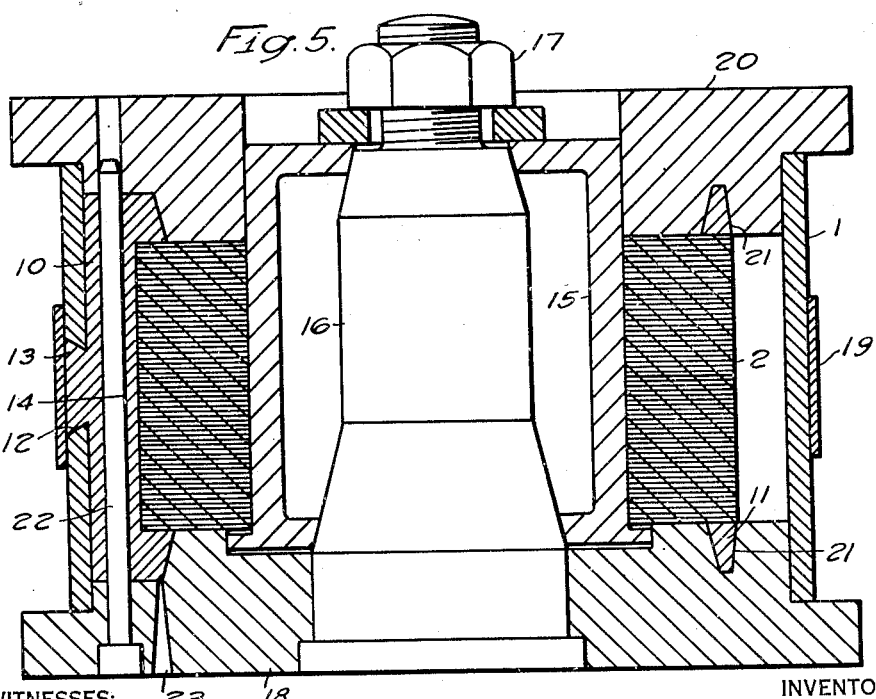

2,488,458

UNITED STATES PATENT OFFICE 2,488,458

STATOR CONSTRUCTION

Howard T. Walton, Pittsburgh, Pa., and Richard F. Woll, Buffalo, N. Y., assignors to Westinghouse Electric Corporation, East Pittsburgh, Pa., a corporation of Pennsylvania Application June 8, 1946, Serial No. 675,346

9 Claims. (Cl. 171—252)

1

The present invention relates to the construction of dynamo-electric machines, and, more particularly, to an improved stator construction for machines of the type in which the stator member includes a laminated core supported in a cylindrical frame member, such as induction motors.

The principal object of the invention is to provide a construction for the stator members of dynamo-electric machines, consisting of a laminated core supported in a cylindrical frame member, which is very strong and rigid, and which can readily be produced at relatively low cost.

Another object of the invention is to provide a stator construction for dynamo-electric machines in which the iron losses produced in the operation of the machine are relatively low, and in which very good ventilation and dissipation of heat are obtained.

A more specific object of the invention is to provide a stator construction for dynamo-electric machines in which a laminated stator core is held in position in a cylindrical frame member by a cage-like retaining means, which rigidly retains the core in position in the frame, and which also holds the core laminations clamped together, so as to eliminate the necessity of using rivets, or other means, for clamping the laminations together. In this way, a simple construction is provided which is very strong and rigid and which can readily be produced at a low cost by die-casting the cage-like retaining means in place after the core and frame have been assembled together.

Other objects and advantages of the invention will be apparent from the following detailed description, taken in connection with the accompanying drawings, in which:

Figure 1 is an end view of a dynamo-electric machine, embodying the invention, the end bracket being omitted for clarity of illustration;

Fig. 2 is a longitudinal sectional view of the stator member of the machine of Fig. 1, the rotor being omitted, and the section being taken approximately on the line II—II of Fig. 1;

Fig. 3 is a fragmentary transverse sectional view, approximately on the line III—III of Fig. 2;

Fig. 4 is a view, in elevation, of a preferred form of core lamination or punching; and Fig. 5 is a sectional view of an apparatus for carrying out a preferred method of producing the stator member, the section being taken on a plane corresponding approximately to that of Fig. 2.

2

A preferred embodiment of the invention is shown in Figures 1 through 4 of the drawings. The machine shown in these figures for the purpose of illustration is an induction motor having a stator member which comprises a cylindrical frame member 1 and a laminated stator core 2 supported in the frame member. The motor also has a rotor member 25, shown as a squirrel-cage rotor of usual construction. The frame member 1 is provided with feet 3, which may be of any suitable type.

The frame member 1 is preferably made from a steel plate rolled into cylindrical shape with its ends welded together. The feet 3 may be welded to the frame, or attached to it in any other suitable manner. The stator core 2 is built up of a plurality of laminations assembled to form an annular core member. The preferred configuration of the laminations, or punchings, is shown in Fig. 4, which shows a single lamination 4. The lamination 4 is designed so that it can be stamped or punched from a square piece of sheet steel, and is generally annular in shape, having a central bore 5 with a series of slots 6 in the periphery of the bore 5 for the reception of an alternating-current primary winding 6', which may be of any suitable type. The outer periphery of the lamination 4 is provided with a plurality of pairs of radially extending projections 7, which form slots or notches 8 between them, the sides of the notches 8 being inwardly tapered as shown, so that the notches are slightly wider at the bottom than at the top. The pairs of radial projections 7 and notches 8 are spaced apart circumferentially around the periphery of the lamination 4, the intervening portions of the periphery being of smaller diameter, as shown. It will be understood that although four pairs of radial extensions 7 with intervening notches 8 have been shown, any suitable number of notches may be provided, spaced apart around the lamination.

The stator core 2 is built up of a plurality of laminations 4 to form a laminated core, with the notches 8 of the laminations in alignment so as to form longitudinal notches or grooves in the outer periphery of the assembled core. The core 2 is disposed in the frame 1 with the radial projections 7 engaging the inner surface of the cylindrical frame. As seen in Fig. 1, the intervening portions of the outer periphery of the core 2, are spaced away from the frame 1 because of their smaller diameter, leaving large axial passages 9 for the circulation of ventilating air between the core and the frame. It is to be understood that, although a preferred configuration of the punchings 4 has been shown and described, they may have any desired configuration, so long as it provides a plurality of longitudinal notches in the outer periphery of the core with peripheral portions of the core engaging the inner surface of the frame on each side of the notches.

The stator core 2 is supported and retained in the frame 1 by the retaining means which is preferably formed as an integral cage-like structure. This retaining means includes longitudinal members or bars 10 disposed in the longitudinal notches 8 of the core, and joined at their ends to continuous end-rings 11 which extend around the core 2 and engage the end surfaces of the core. The bars 10 preferably have enlarged ends 10' which extend over the radial projections 7 and are joined to the end rings 11. The frame 1 has a plurality of outwardly tapered openings 12 formed in it, opposite the notches 8 of the core, and the bars 10 of the retaining means have projecting portions, or extensions, 13 which engage in the openings 12 of the frame 1. It will be apparent that this retaining means rigidly supports the core in position in the frame since the projections 13 of the bars 10 prevent any relative movement of the bars 10, and therefore of the core 2, with respect to the frame 1. The end-rings 11, which engage the end surfaces of the core, prevent axial movement of the core with respect to the bars 10, and they also clamp the core laminations tightly together, thus eliminating the necessity of using rivets, or other means, for holding the laminations 4 in assembled relation. A longitudinal opening 14 may be provided through each of the bars 10 for the reception of through-bolts for securing end brackets to the frame, although any other suitable means might be used for securing the end brackets in place.

The structure described above can readily be produced by die-casting the retaining cage structure in place between the core and the frame. Fig. 5 shows an apparatus for producing the stator member by this method, although other methods might also be employed for producing the new stator. In carrying out the preferred method, the laminations of the stator core 2 are first assembled on a mandrel 15. The mandrel 15 is shown as an expanding mandrel, having a central stem 16 with tapered portions which expand the core-engaging members of the mandrel when the nut 17 is tightened down. This type of mandrel is a well-known device, in itself, and holds the laminations 4 of the core 2 in accurate alignment. The stem 16 of the mandrel is mounted in a lower die-mold 18, and after the laminations have been assembled on the mandrel, the cylindrical frame member 1 is assembled over the stack of laminations, engaging the projections 7 of the core, and with the openings 12 in the frame aligned with the longitudinal notches 8 of the core. A cover or sleeve 19 is placed over the outside of the frame 1 to close the openings 12 in the frame. An upper die-mold 20 is then placed on top of the core 2 and frame 1, as shown, and axial pressure is applied to the upper die-mold 20 by means of a press, or in any other suitable manner, to compress the stack of laminations and to rigidly hold the assembly together.

Each of the molds 18 and 20 has an annular mold cavity 21 extending around the core 2 and having enlargements opposite the ends of the longitudinal notches 8. The lower die-mold 18 also has vertical pins 22 supported in it, which extend through the center of each of the longitudinal notches 8 to form the openings 14. The lower die-mold 18 has a plurality of openings, or gates, 23 through which the mold cavities are filled.

After the core 2 and frame 1 have been assembled between the molds 18 and 20, as described above, and while axial pressure is applied to the assembly, the retaining cage structure is die-cast in place by forcing a suitable molten metal, such as aluminum, through the gates 23 in the lower mold 18. The molten metal is forced into the mold under pressure from any suitable die-casting apparatus, and fills the mold cavities in both molds, the longitudinal notches 8, and the openings 12 in the frame 1. After the metal has solidified, the pressure is removed and the molds 18 and 20, the cover 19, and mandrel 15 are withdrawn from the assembly. The feet 3 can then be welded to the frame 1 and the stator member is complete, ready for the reception of the primary winding 6' in the slots 6, after which end-brackets of any suitable type may be applied for supporting the rotor member 25.

The stator construction described above has many advantages. It will be apparent that this construction is quite strong and rigid, since the laminated core 2 is held in position by a cage structure which engages the end surfaces of the core and which also engages in the openings 12 in the frame. The continuous end-rings 11 of the retaining cage structure also tend to strengthen the cylindrical frame 1. The sides of the longitudinal notches 8 in the stator core and of the openings 12 in the frame are oppositely tapered, as shown in the drawings, so that shrinkage of the metal of the cage structure during cooling draws the core tightly against the frame, thus producing a very rigid structure. The end-rings 11 of the cage structure, which are integral with the longitudinal members 10, engage the end surfaces of the core and hold the core laminations clamped tightly together, so that no other clamping means is required and the rivets usually used for this purpose are eliminated. The continuous end-rings also reduce the tendency of the laminations to flare.

Since the laminations of the core 2 do not surround the longitudinal members 10 of the cage structure, little or none of the magnetic flux of the machine will link the longitudinal members, and thus no appreciable eddy currents will be produced in them, so that no noticeable losses occur. A small portion of the outside surface of the laminations may be short-circuited by the longitudinal members 10, but considerable oxidation of the laminations occurs during the die-casting operation, which increases the interlaminar resistance so that the iron loss is not increased over that of conventional constructions. The elimination of the rivets used for clamping the core laminations together in conventional constructions tends to reduce the iron losses by eliminating the eddy current losses which occur in the rivets. The preferred construction shown in the drawings permits very effective ventilation of the stator because of the large ventilating passages 9 between the core and the frame. The longitudinal members 10 of aluminum also assist in cooling the motor because their high thermal conductivity facilitates the flow of heat to the ends of the machine where it can readily be dissipated. Thus, a stator member is provided in which the iron losses are quite low, and which can be very effectively ventilated.

It will be apparent that the new stator member can readily be produced at relatively low cost by the use of die-casting in the manner described above, although other methods of constructing the stator might be employed, if desired. In the preferred method of construction, however, relatively few tools are required to provide for a large range of electrical designs, and the assembly time required is quite small, so that the cost of the stator can be made very low. It will be seen that slight inaccuracies in the inside diameter of the frame member 1 are unimportant, and machining of this surface is therefore unnecessary, so that this machining step, which is usually required in conventional constructions, is eliminated. The punchings of the stator core are accurately aligned on the mandrel 15 and, in many cases, this makes it unnecessary to grind the stator bore after assembly, thus making possible a further saving in cost.

It should now be apparent that a stator construction for dynamo-electric machines has been provided which has many advantages. A preferred embodiment of the invention, and a preferred method of producing the new structure, have been described, but it will be understood that the structure might be produced by other methods, and that various modifications of the structure are possible within the scope of the invention. Thus, for example, the configuration of the core laminations may be varied in any desired manner, and any number and shape of openings 12 in the frame might be used. It is to be understood, therefore, that the invention is not restricted to the specific structural details described above for the purpose of illustration, but, in its broadest aspects, it includes all equivalent embodiments and modifications which come within the scope of the appended claims.

We claim as our invention:

1. A dynamo-electric machine having a stator member and a rotor member, said stator member comprising a generally cylindrical frame member, a laminated core supported in said frame member, an alternating-current primary winding carried on said core, said core having a plurality of longitudinal notches in its outer periphery, the core engaging the inner surface of the frame on both sides of each notch, longitudinal members disposed entirely within said notches in the core, means for preventing movement of said longitudinal members relative to the frame member, and end members joined to the ends of said longitudinal members and engaging the end surfaces of the core.

2. A dynamo-electric machine having a stator member and a rotor member, said stator member comprising a generally cylindrical frame member, a laminated core supported in said frame member, an alternating-current primary winding carried on said core, said core having a plurality of longitudinal notches in its outer periphery, the core engaging the inner surface of the frame on both sides of each notch, longitudinal members disposed entirely within said notches in the core, means for preventing movement of said longitudinal members relative to the frame member, and end-rings joined to the ends of said longitudinal members and engaging the end surfaces of the core.

3. In a dynamo-electric machine, a generally cylindrical frame member, a laminated core supported in said frame member, said core having a plurality of longitudinal notches in its outer periphery, the core engaging the inner surface of the frame on both sides of each notch, and retaining means for retaining said core in position in the frame member, said retaining means comprising longitudinal members disposed entirely within said notches in the core, said longitudinal members having projecting portions engaging in openings in the frame member, and end members joined to said longitudinal members and engaging the end surfaces of the core.

4. In a dynamo-electric machine, a generally cylindrical frame member, a laminated core supported in said frame member, said core having a plurality of longitudinal notches in its outer periphery, the core engaging the inner surface of the frame on both side of each notch, and retaining means for retaining said core in position in the frame member, said retaining means comprising longitudinal members disposed entirely within said notches in the core, said longitudinal members having projecting portions engaging in openings in the frame member, and end-rings joining the ends of said longitudinal members and engaging the end surfaces of the core.

5. In a dynamo-electric machine, a generally cylindrical frame member, a laminated core supported in said frame member, said core having a plurality of longitudinal notches in its outer periphery, the core engaging the inner surface of the frame on both sides of each notch, and retaining means for retaining said core in position in the frame member, said retaining means comprising a cage-like structure including longitudinal members disposed entirely within said notches in the core and end-rings joining the ends of the longitudinal members and engaging the end surfaces of the core, said frame member having openings therein opposite said notches, and said longitudinal members having projecting portions engaging in said openings to prevent movement of the core relative to the frame member.

6. In a dynamo-electric machine, a generally cylindrical frame member, a laminated core supported in said frame member, said core having spaced peripheral portions engaging the frame member, the intervening portions of the periphery being of smaller diameter and spaced from the frame member to provide ventilating passages, said frame-engaging peripheral portions of the core having longitudinal grooves therein, longitudinal members disposed in said grooves, means for preventing movement of said longitudinal members relative to the frame member, and end-rings joined to the ends of said longitudinal members and engaging the end surfaces of the core.

7. In a dynamo-electric machine, a generally cylindrical frame member, a laminated core supported in said frame member, said core having spaced peripheral portions engaging the frame member, the intervening portions of the periphery being of smaller diameter and spaced from the frame member to provide ventilating passages, said frame-engaging peripheral portions of the core having longitudinal grooves therein, longitudinal members disposed in said grooves, said longitudinal members having projections thereon engaging in openings in the frame member, and end-rings joined to the ends of said longitudinal members and engaging the end surfaces of the core.

8. In a dynamo-electric machine, a generally cylindrical frame member, a laminated core supported in said frame member, said core having spaced peripheral portions engaging the frame member, the intervening portions of the periphery being of smaller diameter and spaced from the frame member to provide ventilating passages, said frame-engaging peripheral portions of the core having longitudinal grooves therein, and retaining means for retaining said core in position in the frame member, said retaining means comprising an integral, cage-like structure having longitudinal members disposed in said grooves in the core, means for preventing movement of said longitudinal members relative to the frame member, and end-rings joining the ends of the longitudinal members and engaging the end surfaces of the core.

9. In a dynamo-electric machine, a generally cylindrical frame member, a laminated core supported in said frame member, said core having spaced peripheral portions engaging the frame member, the intervening portions of the periphery being of smaller diameter and spaced from the frame member to provide ventilating passages, said frame-engaging peripheral portions of the core having longitudinal grooves therein, and retaining means for retaining said core in position in the frame member, said retaining means comprising an integral cage-like structure having longitudinal members disposed in said grooves in the core, said longitudinal members having projections engaging in openings in the frame member, and end-rings joining the ends of the longitudinal members and engaging the end surfaces of the core.

HOWARD T. WALTON.
RICHARD F. WOLL.

REFERENCES CITED

The following references are of record in the file of this patent:

UNITED STATES PATENTS

| Number | Name | Date |
|---|---|---|
| 1,085,116 | Ford | Jan. 27, 1914 |
| 1,711,414 | Kanaky | Apr. 30, 1929 |
| 1,980,026 | Wood | Nov. 6, 1934 |

FOREIGN PATENTS

| Number | Country | Date |
|---|---|---|
| 372,726 | Great Britain | Oct. 31, 1930 |